United States Patent [19]
Brooks

[11] 3,751,175
[45] Aug. 7, 1973

[54] PORTABLE LINE BORING BAR ASSEMBLY
[75] Inventor: Daryl G. Brooks, Fresno, Calif.
[73] Assignee: Porta-Tool Incorporated, Clovis, Calif.
[22] Filed: Nov. 5, 1970
[21] Appl. No.: 87,178

[52] U.S. Cl. ................................ 408/72, 408/80
[51] Int. Cl. ............................................ B23b 41/12
[58] Field of Search ............... 408/36, 80, 81, 54, 408/72; 82/2 E; 90/26

[56] References Cited
UNITED STATES PATENTS

| | | | |
|---|---|---|---|
| 2,651,221 | 9/1953 | Foster | 408/72 |
| 2,416,402 | 2/1947 | Mitchell | 408/72 X |
| 2,413,574 | 12/1946 | Mitchell | 408/54 X |
| 2,401,838 | 6/1946 | Mitchell | 408/72 X |
| 1,748,876 | 2/1930 | Green | 408/72 |

FOREIGN PATENTS OR APPLICATIONS

| | | | |
|---|---|---|---|
| 19,181 | 7/1912 | Great Britain | 408/81 |
| 985,173 | 3/1965 | Great Britain | 408/81 |

*Primary Examiner*—Francis S. Husar
*Attorney*—Huebner & Worrel

[57] ABSTRACT

A portable line boring bar assembly for in-line boring the main bearing bores of an engine block for re-establishing their precise concentricity and axial alignment longitudinally of such a block providing an elongated boring bar for extension longitudinally through the bores of the block having centering means slidably mounted on the bar for temporary wedging engagement in selected bores of the block precisely to center the bar relative to the bores with bar support means releasably mounted on the block in spaced relation to the bores to hold the bar in said centered position during powered rotation and axial feeding movement of the bar in the block and including pre-set bore cutting means adapted to be releasably mounted in any desired location along the boring bar adjacent to said bores in the block. The assembly is readily portable and suitable for "in the field" utilization.

7 Claims, 8 Drawing Figures

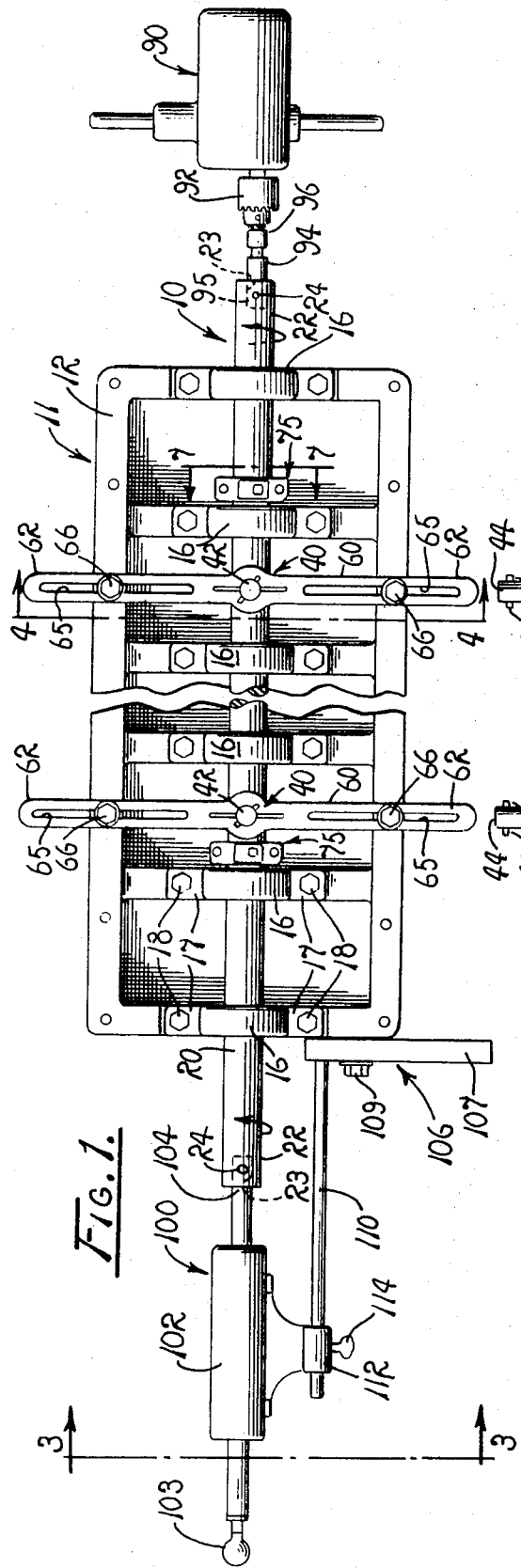
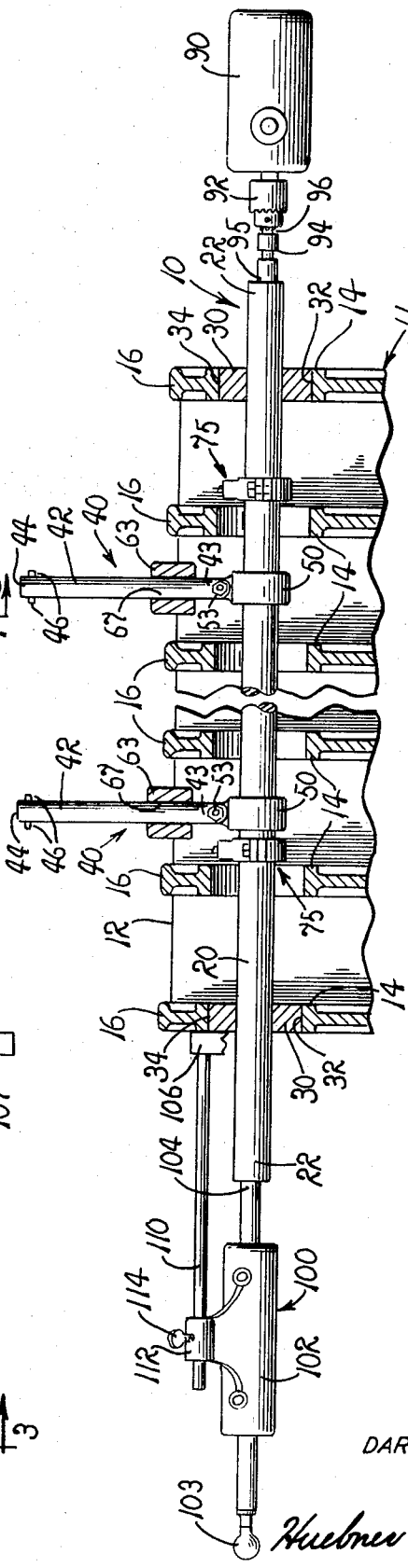

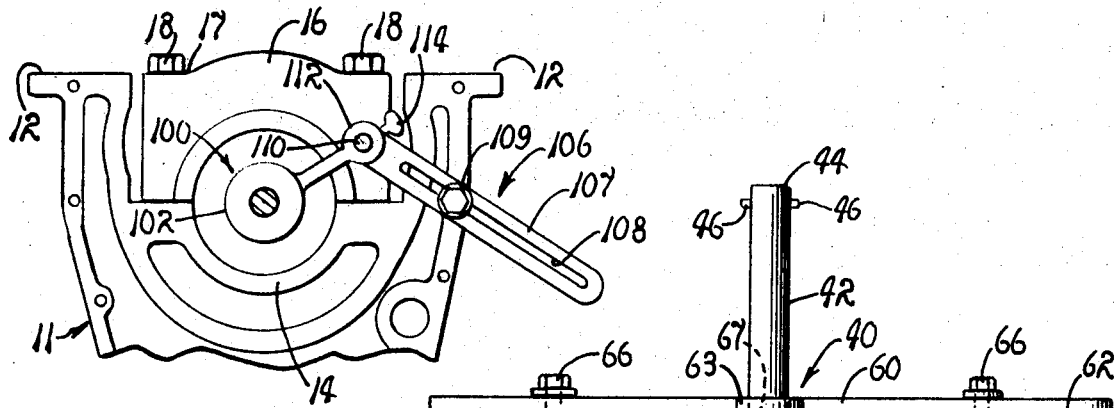
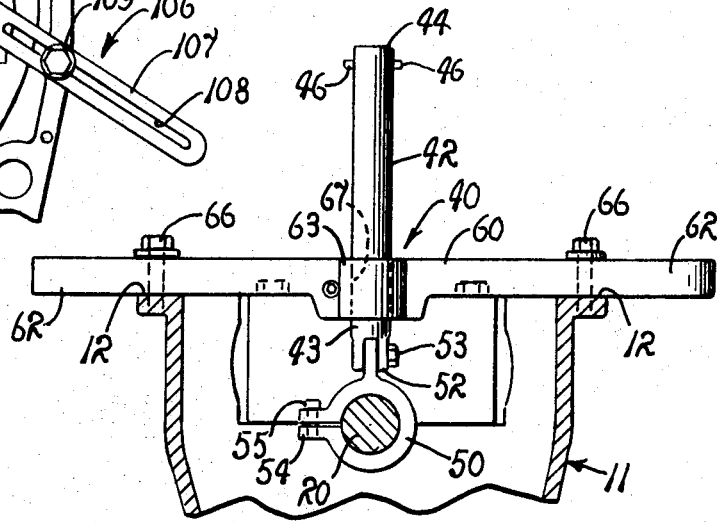
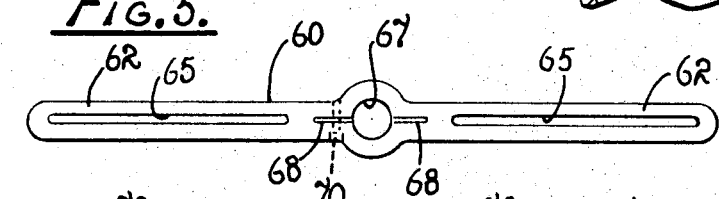
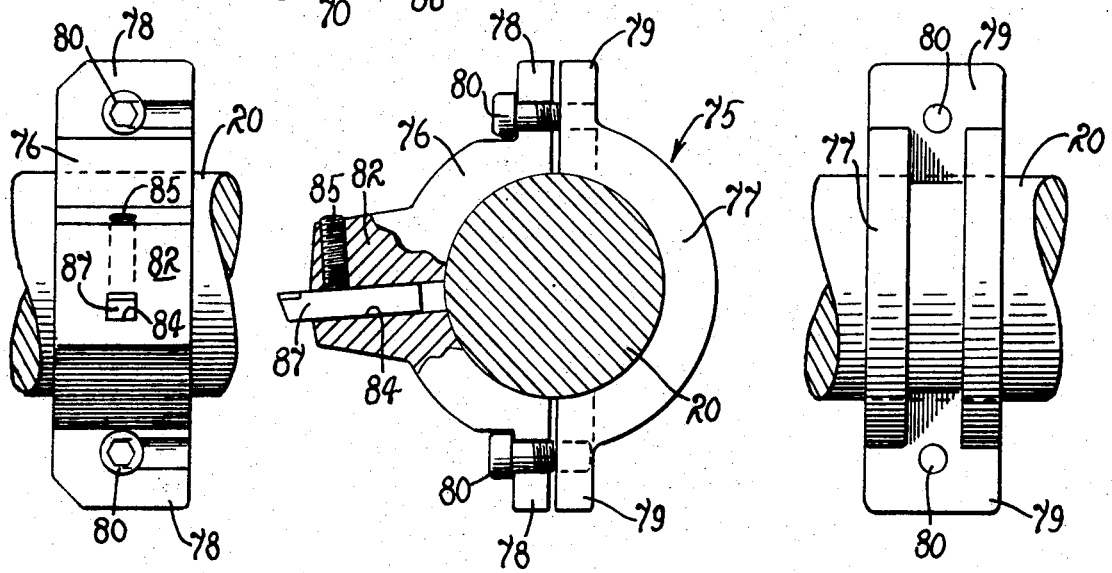

PORTABLE LINE BORING BAR ASSEMBLY

BACKGROUND OF THE INVENTION

One or more of the crankshaft main bearing bores in the block of an engine frequently become worn or axially misaligned due to warpage from heat distortion or the like which requires that the engine be torn down for repair. The crankshaft bores are individually partially formed by a semi-circular bearing saddle integrally cast and machined within the block with the saddle having a semi-circular machined bearing cap releasably fitted thereto so as to define a cylindrical bore. Presently, the factory provides fully finished precision replacement caps for those caps that have experienced some type of failure, distortion or other malformation such as having become scored or otherwise worn to the point of impairing proper engine operation. Such caps are adjusted in the field by the use of shims which is a tedious, time-consuming job. Furthermore, true concentricity of the bores cannot always be accurately re-established by this method nor precise axial alignment of any particular bore with its adjacent bearing bores even if true cylindricality of each bearing bore is obtained.

Conventional field boring bars for this purpose usually mount a single tool bit within a slot in the boring bar itself. Consequently, the boring bar must be axially repositioned during the boring operation for each main bearing bore. The tool bit has to be tediously set for each cut through the individual bearing bores with a micrometer after installation of the boring bar in its desired central position within the existing bores of the block. This operation is extremely difficult accurately and conveniently to accomplish in view of the relatively small space afforded within the block adjacent to the main bearing bores. Furthermore, such conventional bars are required to be of a sufficiently large diameter rigidly to hold the tool bit to prevent chatter and the like so that the weight thereof is extremely difficult to be handled by a single workman. The only other line boring machine presently available accommodates the entire block which is similar to the machine employed during initial manufacture of the block which is too cumbersome and expensive for use in the field.

SUMMARY OF THE INVENTION

Accordingly, it is an object of the present invention to provide an improved line boring bar assembly.

Another object is to provide such an assembly that is portable.

Another object is to provide such an improved portable line boring bar assembly for in-line boring the main bearing bores of engines.

Another object is to provide an improved portable line boring bar assembly of the character described which is relatively lightweight, simply constructed, and economically manufactured.

Another object is to provide an improved portable line boring bar assembly which can be conveniently employed in the field.

Another object is to provide an improved portable line boring bar assembly which permits the use of semi-finished bearing caps which are easily and conveniently finish-bored in assembly upon the bearing saddles of an engine block.

Another object is to provide an improved portable line boring bar assembly which is ideally suited for boring one or a plurality of main bearing bores in an engine block with a single set-up of the boring bar on the block, thus obviating the inaccuracies, inconveniences, lost time and expenses of repetitious re-setting operations.

Another object is to provide an improved portable in-line boring bar assembly which utilizes an elongated boring bar adapted to be rotatably driven at one of its ends by a conventional electric drill and positively axially driven at its opposite end by an hydraulic feeding device mountable on the block.

Another object is to provide an improved portable in-line boring bar assembly in which said drive devices are selectively connectable at either end of the boring bar.

Other objects and advantages of the present invention will subsequently become more clearly apparent upon refernece to the following description and accompanying drawings.

BRIEF DESCRIPTION OF THE DRAWINGS

FIG. 1 is a top plan view of the lower side or pan rail of an engine block having a portable in-line boring bar assembly embodying the principles of the present invention installed therethrough and illustrated as adapted for boring at least two of the main crankshaft bearing bores of the engine.

FIG. 2 is a vertical longitudinal section taken substantially centrally through the block of FIG. 1, showing the in-line boring bar assembly of the present invention in side elevation.

FIG. 3 is a somewhat enlarged end elevation of the engine block, as viewed in the direction of the arrows on line 3—3 of FIG. 1.

FIG. 4 is a somewhat enlarged transverse vertical section through the block and in-line boring assembly, taken on line 4—4 of FIG. 1.

FIG. 5 is a top plan view of a bridging member of one of the upright bearing supports for the in-line boring assembly removed from the engine block.

FIG. 6 is a somewhat enlarged front elevation of one of the cutter bit holders of FIGS. 1 and 2 shown in clamping relation about the boring bar of the present invention.

FIG. 7 is a somewhat enlarged transverse vertical section through the boring bar, taken on line 7—7 of FIG. 1, showing the cutter bit holder in side elevation.

FIG. 8 is a somewhat enlarged rear elevation of the cutter bit holder of FIGS. 6 and 7.

DESCRIPTION OF THE PREFERRED EMBODIMENT

Referring more particularly to the drawings, a portable in-line boring bar assembly embodying the principles of the present invention is generally indicated by the reference numeral 10 and is shown in an operating position extending through an engine block 11. The engine block is of conventional construction and is shown in an inverted position to present its lower surface or pan rail 12 during the line boring operation. The block has a plurality of semi-circular integrally cast bearing saddles 14 disposed therein in predetermined longitudinally spaced relation. A corresponding number of semi-circular bearing caps 16 having diametrically oppositely extended pads 17 are conventionally bolted by cap screws 18 to the saddles 14 to form a plurality of main bearing bores 19 in the block. After removal of the bearing caps 16 and the engine crankshaft, not shown, only one or two of the bearing bores may need attention in instances where the associated bearing cap has been damaged by fatigue failure or the like or through heat distortion the block and saddle 14 have shifted out of alignment with the adjacent main bearing bores. On the other hand, such warpage of the block or damage to the bearing caps may be so severe that all the bores require reworking. In either instance, the present invention is ideally suited for the task.

The repair of the main bearing bores 19 of the block 11 is easily and conveniently accomplished by the boring bar assembly 10 of the present invention which provides an elongated cylindrical boring bar 20 of a length to extend entirely longitudinally through the block. The boring bar includes opposite ends 22, each of which has a drive adapter socket 23 therein with a locking setscrew 24 extended radially through the end of the boring bar for extension into its associated socket. A pair of annular centering rings 30 are employed initially to locate the boring bar in a precisely coaxial centered relation with respect to the bearing bores in the engine block 11. Each of the centering rings has a circular aperture 32 through which the boring bar is axially slidably received and an outer periphery 34 of a size adapted to be received within the bearing bores of the block in tightly wedging relation.

The boring bar assembly 10 of the present invention also includes a plurality of upright bearing assemblies 40 which are particularly useful for supporting the boring bar intermediate its ends when rebuilding relatively long engine blocks such as diesel tractor engines and the like. However, the embodiments of the present invention are also readily adapted to be provided in various sizes including a relatively small boring bar assembly for the relatively small engines utilized in Volkswagen automobiles and the like. As best shown in FIGS. 4 and 5, each of the bearing assemblies 40 has an elongated mounting post or arm 42 having a predetermined lower bifurcated end 43 and an opposite upper end 44. The upper end includes a pair of diametrically opposed outwardly extended pins 46. An annular bearing 50 is pivotally mounted on the lower bifurcated end 43 of the mounting post to permit relative movement between the bearing and the mounting post during initial assembly of the boring bar 20 into the block 11. The bearing has an upwardly extended tab 52 which is slidably received between the legs of the bifurcated lower end of the post and which is pivotally held in assembly therewith by a capscrew 53 screw-threadably extended through the legs and tab. The bearing further includes a pair of clamping pads 54 in lateral extension from the bearing which have a locking setscrew 55 extended therethrough to adjust the tension of the bearing around the boring bar.

The bearing mounting posts 42 are individually supported on the engine block 11 by an elongated bridging member or bracket 60 having opposite ends 62 and an intermedite enlarged boss 63 disposed centrally thereof. The opposite ends of the bridging member include elongated bolting slots 65 through which are extended mounting capscrews 66 which are screw-threadably received in selected pairs of a plurality of screw-threaded holes in the pan rail 12 of the engine block. A transverse bore 67 is formed through the central boss 62 of the bridging member and a pair of diametrically opposed clamping slots 68 extend through the boss in communication with the bore. A locking setscrew 70 is screw-threadably extended through one of the slots in order tightly to clamp the bridging member about the mounting post 42 of the bearing assembly extended therethrough. As best shown in FIG. 1, it will be noted that the pins 46 in the mounting post 42 are angularly related to the plane of the slots 68 through the bridging member in order to provide a stop in the event that the boring bar is inadvertently removed from the bearing to preclude complete separation by downward gravitational descent of the mounting post through the bridging member.

The boring bar assembly 10 of the present invention further includes a plurality of cutter bit tool holers 75 which are adapted to be individually clamped about the boring bar 20 in any desired location between its opposite ends 22. As best shown in FIGS. 6 through 8, the tool holder provides a semi-circular tool mounting portion 76 and an opposite clamping portion 77. Pairs of outwardly extended assembly flanges 78 and 79, respectively, are releasably constrained in assembly by a pair of screw-threaded locking setscrews 80 extended therethrough for tightly clamping the tool holder about the boring bar 20. The tool mounting portion 76 of the holder provides a radially outwardly extended protuberance 82 which has an elongated tool bit mounting slot 84 extended therethrough and a tool bit clamping screw 85 laterally extended through the protuberance in communication with the slot. A conventional carbide-tipped tool bit 87 is adapted to be mounted within the slot 84 of the protuberance and tightly clamped by the locking screw in any desired extended position therefrom corresponding to the size of the main bearing bore to be finished or initial cut to be made.

The boring bar 20 is adapted to be rotatably driven by a conventional electric drill 90 having a drive chuck 92. A universal coupling adapter 94 is employed by the boring bar assembly 10 of the present invention for connecting the electric drill to either end 22 of the boring bar. The adapter has an end 95 which is slidably receivable within the socket 23 in the selected end of the boring bar which is constrained therein by the setscrew 24. The adapter includes an opposite end 96 which is tightly received and clamped within the chuck 92 of the drill.

The boring bar 20 is adapted to be axially indexed or traveled through the block 11 by an hydraulic feeding device generally indicated by the reference numeral 100. Such feeding devie is substantially similar to that employed with the boring tool of my prior U.S. Pat. No. 3,331,266 to which attention is directed for a full description of its internal mechanism and operation. Briefly, however, in its present use, the hydraulic feeding device provides an elongated cylindrical body 102 having an elongated piston actuating control rod and handle assembly 103 extended from the outer end thereof and an opposite coupling member 104 extended from its opposite inner end for extension into the socket 23 at the opposite end of the boring bar from the drill 90. The hydraulic feeding device is adapted to be rigidly mounted on one end of the engine block 11 by an anti-rotation torsion bar mounting frame 106 adjustably secured to the end of the block.

The mounting frame 106 provides an elongated torsion bar 107 having an elongated adjusting slot 108 therein which is bolted to the end of the block 11 by a capscrew 109. The bar provides an elongated rod 110 which is extended therefrom in spaced substantially parallel relation to the cylinder body 102 of the hydraulic feeding device. The feeding device has an arm radially extended therefrom providing a sleeve 112 circumscribing the rod. A thumbscrew 114 is screwthreadably received in the sleeve for tightly clamping the feeding device on the rod 110. The hydraulic feeding device is adapted axially to drive the boring bar in either direction by extension or retraction of the connector 104 relative to the body 102 upon appropriate manipulation of the actuating handle 103 depending upon the direction of rotation of the boring bar and location of the tool bit holders 75 relative to the main bearing bores 19 of the engine block 11.

OPERATION

The operation of the described embodiment of the subject invention is believed to be clearly apparent and is briefly summarized at this point. Prior to extension of the boring bar 20 through the main bearing bores of the engine block 11, a pair of the centering rings 30 are rested within the selected bearing saddles 14 and the bearing caps 16 installed by manipulation of the capscrews 18 through the mounting pads 17. The salvagable bearing caps are replaced on the bearing bores not requiring attention while new semi-finished bearing caps are utilized on those bores requiring the reworking operation. As shown in FIG. 2, the centering rings are disposed in the end main bearing bores which, in this particular instance, do not require re-boring. When, however, the end bearings are required to be re-bored, the centering rings can be disposed in any of the selected inboard main boring bores in sufficiently spaced relation to afford the necessary stability to insure precise centering of the boring bar through the bores in the engine block.

After installation of the centering rings 30 and proper tightening of the bearing cap mounting screws 18, the boring bar 20 is oiled, extended through one of the centering rings and axially shoved into the block for extension through one of the upright bearing assemblies 40 which may be held in any selected position between a pair of the main bearing bores. The boring bar is also extended through a second upright bearing assembly adjacent to the opposite end of the block and through the centering ring 30 to a position where the opposite ends 22 of the boring bar are outwardly extended from their adjacent ends of the block.

The bridging members 60 are installed over the mounting posts 42 of their respective upright bearing assemblies 40 by sliding the bore 67 in the boss 63 over the upper end 44 of the mounting post with the pins 46 sliding through the slots 68 in the bridging member to permit downward sliding movement of the bridging member until rested upon the upwardly disposed pan rail 12 of the engine block. The bridging member is rotated slightly about the mounting post in order to dispose it in a plane substantially normal to the axis of the boring bar so as angularly to misalign the slots 68 with the pins 46. Accordingly, in the event that the boring bar is inadvertently removed from the block, the upright bearing assemblies 40 will be supported by engagement of the pins with the top surface of the bridging member. The lock bolts 70 are then tightened into selected threaded holes in the pan rail of the block and the bearing 50 locked by tightening of the lockscrew 53 so as precisely to hold the boring bar in centered relation with respect to all of the main bearing bores in the block as established by the centering rings 30.

At this point, the centering rings may remain in their initially installed positions or removed from the block, as desired. Such removal may be necessary in instances where the main bearing bore in which they were disposed is required to be reworked. In any event, the tool bit holders 75 are mounted in circumscribing relation about the boring bar 20 in any desired location closely adjacent to each of the main bearing bores to be reworked. The electric drill 90 is installed at one end of the boring bar and the hydraulic feeding device 100 disposed at the opposite end of the boring bar in the manner previously described. Upon energization of the hydraulic feeding device and the electric drill, the tool bit 87 is rotated in cutting relation into and through its adjacent main bearing bore to finish the same to the desired size. While only one or two of the main bearing bores usually require re-boring, it is apparent that a sufficient number of the tool bit holders 75 can be simultaneously mounted on the boring bar for concurrent boring of all the main bearing bores in a single pass.

As shown in FIG. 2, the boring bar tool bit holders 75 are axially fed from right to left upon retraction of the connector 104 into the cylindrical body 102 of the hydraulic feeding device 100. However, if there should be insufficient clearance to the left of the main bearing bores to permit the bore to be fully finished by the tool bit 87, the holders can be initially mounted on the left side of the bearing bores and the actuating handle 103 of the hydraulic feeding device appropriately manipulated to cause extension of the connector 104 from the cylinder body thereof for feeding the boring bar from left to right, as viewed in FIG. 2.

In view of the foregoing, it is readily apparent that the structure of the present invention provides an improved portable in-line boring bar assembly which enables the main bearing bores of an engine block easily and conveniently to be re-bored in precise axial alignment and individually returned to precise cylindrically and concentricity. The boring bar assembly of the present invention utilizes a conventional electric drill as a rotary drive member and a known hydraulic axial feeding device which is borne by the engine block so that such in-line boring operation can be successfully accurately accomplished in the field. Such assembly enables the use of semi-finished bearing caps which are accurately finished after installation into the engine block so as to provide a custom assembly with their associated main bearing saddles to re-establish the same optimum tolerances as initially provided by the factory.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. A portable line boring bar assembly, for in-line boring the main bearing bores of engine blocks for re-establishing their precise cylindricality and axial alignment longitudinally of such a block, comprising an elongated boring bar for extension longitudinally through the bores of said block; centering means slidably mounted on said boring bar for temporary fitted engagement in selected bores of the block precisely to center the boring bar relative to said bores; bar support means releasably mounted on said block in spaced relation to said bores to hold said boring bar in said centered position during powered rotation and axial feeding movement of the boring bar in the block, said bar support means including a plurality of bridging members individually having an upper bracket adapted to be bolted across said block, an arm adjustably extended through said bracket into the block, and a bearing on the distal end of said arm rotatably and axially slidably receiving said bar therethrough; said arm of the bridging member having an upper end, a pair of diametrically opposed pins extended from said upper end of said arm, and slots in said bracket for receiving said pins therethrough to permit downward sliding of said bracket over the arm with said pins being angularly related to the slots upon rotation of the arm to align said bearing with said boring bar to provide a positive stop to preclude inadvertent disassembly by gravitational descent of the arm and bearing from the bracket should the boring bar be prematurely removed from said bearing; and pre-set bore cutting means adapted to be releasably mounted in selected location along said boring bar adjacent to said bores of the block.

2. The line boring bar assembly of claim 1 in which said cutting means includes a separable tool bit holder adapted to be releasably clamped around said boring bar in any desired axial position therealong, a tool bit adjustably slidably mounted in the holder, and lock means releasably to hold the bit in predetermined radial extension from the holder.

3. The line boring bar assembly of claim 2 in which said boring bar includes opposite ends, powered rotary drive means releasably connectable to one end of the bar, and axial drive means releasably connectable to the opposite end of said bar from the rotary drive means with each of said opposite ends of the bar being adapted selectively alternatively to receive either of said drive means.

4. The line boring bar assembly of claim 3 in which said rotary drive means is an electrically powered hand drill, a bore in each of the opposite ends of said boring bar, and adapter means releasably mounted in a selected one of said bores providing an elongated chucking spindle for the drill.

5. The line boring bar assembly of claim 4 in which said axial drive means is an hydraulically powered drive unit adapted to feed in either axial direction having a coupling end releasably selctively mountable in said bores of said ends of the boring bars.

6. A line boring bar assembly for in-line boring of bearing bores of engine blocks having more than two aligned bearing bores for establishing their cylindricality, axial alignment, and desired diameter comprising an elongated boring bar; a plurality of rings fitted to at least two of the bearing bores and adapted to be clamped therein releasably rotatably mounting the bar for rotation and longitudinal advancement concentrically of said bores while extended through another of the bores; drive means connected to the bar for rotating the bar; further drive means connected to the bar for advancing the bar axially in the bearing bores during rotation; and cutting means releasably mounted on the bar adjacent to said other bore and caused to traverse the same while the bar is rotated and advanced including a separable tool bit holder adapted to be releasably clamped around said boring bar in any desired axial position therealong, a tool bit adjustably slidably mounted in the holder, and lock means releasably to hold the bit in predetermined radial extension from the holder.

7. A portable line boring bar assembly, for in-line boring the main bearing bores of engine blocks for re-establishing their precise cylindricality and axial alignment longitudinally of such a block, comprising an elongated boring bar for extension longitudinally through the bores of said block; centering means slidably mounted on said boring bar for temporary fitted engagement in selected bores of the block precisely to center the boring bar relative to said bores; bar support means releasably mounted on said block in spaced relation to the said bores to hold said boring bar in said centered position during powered rotation and axial feeding movement of the boring bar in the block; said bar support means including a plurlaity of bridging members having brackets adapted to be mounted on the block individually having an arm extended through the bracket into the block, and a bearing on the distal end of said arm rotatably and axially slidably receiving the bar therethrough, said arm of the bridging member having an upper end, stop means on the upper end of said arm, and a slot in the bracket for receiving the stop means therethrough to permit downward sliding of said bracket over the arm with said stop means being angularly displaced from its slot upon rotation of the arm to align said bearing with said boring bar to provide a stop to preclude inadvertent disassembly by gravitational descent of the arm and bearing from the bracket when the boring bar is removed from the bearing.

* * * * *